United States Patent
Sakamoto et al.

(10) Patent No.: US 7,171,846 B2
(45) Date of Patent: Feb. 6, 2007

(54) IN-CYLINDER PRESSURE DETECTION DEVICE

(75) Inventors: Hideki Sakamoto, Saitama-ken (JP); Satoshi Yamaguchi, Saitama-ken (JP); Yuuichi Shimasaki, Saitama-ken (JP); Makoto Kobayashi, Saitama-ken (JP); Masaki Ueno, Saitama-ken (JP); Mamoru Hasegawa, Saitama-ken (JP)

(73) Assignees: NGK Sparkplug Co. Ltd., Aichi (JP); Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/075,754

(22) Filed: Mar. 10, 2005

(65) Prior Publication Data

US 2005/0229685 A1 Oct. 20, 2005

(30) Foreign Application Priority Data

Mar. 31, 2004 (JP) ............................. 2004-107357

(51) Int. Cl.
*G01M 15/00* (2006.01)

(52) U.S. Cl. ....................................... 73/115; 73/35.13

(58) Field of Classification Search ............... 73/35.01, 73/35.07, 35.12, 35.13, 112, 115, 116, 117.2, 73/117.3
See application file for complete search history.

(56) References Cited

U.S. PATENT DOCUMENTS

| 4,382,377 A | * | 5/1983 | Kleinschmidt et al. .... 73/35.13 |
| 4,483,181 A | * | 11/1984 | Maekawa et al. .......... 73/35.13 |
| 4,686,861 A | * | 8/1987 | Morii ....................... 73/862.68 |
| 4,898,024 A | * | 2/1990 | Takeuchi ...................... 73/115 |
| 4,909,071 A | * | 3/1990 | Amano et al. ................ 73/115 |
| 4,984,905 A | * | 1/1991 | Amano et al. .............. 374/143 |
| 5,101,659 A | * | 4/1992 | Takeuchi ...................... 73/115 |
| 5,126,617 A | * | 6/1992 | Lukasiewicz et al. ....... 310/338 |
| 5,323,643 A | * | 6/1994 | Kojima et al. ................ 73/115 |
| 6,138,654 A | * | 10/2000 | Pretorius et al. ............ 123/642 |

FOREIGN PATENT DOCUMENTS

| EP | 2002339793 | 11/2002 |
| WO | WO 2004/063631 | 7/2004 |

\* cited by examiner

*Primary Examiner*—Eric S. McCall
(74) *Attorney, Agent, or Firm*—Arent Fox PLLC

(57) ABSTRACT

An in-cylinder pressure detection device which is capable of ensuring stable detection accuracy irrespective of tightening torque applied in mounting the in-cylinder pressure detection device and thermal expansion of component parts of the same. A housing 21 has a top wall 22a and a bottom wall 22b opposed to each other, and is screwed into the body of an internal combustion engine. An inner member 24 extends through the housing 21 such that one end thereof projects into a cylinder C, and has a flange part 24b accommodated in the housing 21. A first piezoelectric element 11c is accommodated in the housing 21 and sandwiched between the bottom wall 22b and the flange part 24b in a preloaded state, for outputting a first detection signal q1 according to the in-cylinder pressure transmitted via the inner member 24. A second piezoelectric element 12c is accommodated in the housing 21 and sandwiched between the top wall 22a and the flange part 24b in a preloaded state, for outputting a second detection signal q2 according to the in-cylinder pressure transmitted via the inner member 24.

4 Claims, 2 Drawing Sheets

IN-CYLINDER PRESSURE DETECTION DEVICE

BACKGROUND OF THE INVENTION

1. Field of the Invention

This invention relates to an in-cylinder pressure detection device mounted on an internal combustion engine to detect pressure within a cylinder.

2. Description of the Related Art

Conventionally, an in-cylinder pressure detection device of the above-mentioned kind has been disclosed e.g. in Japanese Laid-Open Patent Publication (Kokai) No. 2002-339793. The detection device is integrally formed with a glow plug inserted into a cylinder head of an internal combustion engine, and has a piezoelectric element. The glow plug is comprised of a housing, a heater case provided at the lower end of the housing, and a center shaft extending upward from the inside of the housing and in contact with the heater case. Further, the glow plug is mounted in the cylinder head by screwing the housing into the cylinder head such that the heater case projects into the combustion chamber. The piezoelectric element is sandwiched between the housing and a nut screwed onto the center shaft, thereby being fixed to the upper end face of the housing in a preloaded state.

In the detection device, when the heater case of the glow plug is distorted due to combustion pressure, the distortion is transmitted to the center shaft, whereby the nut fixing the piezoelectric element is displaced vertically. As a result, the preload on the piezoelectric element is changed to cause distortion of the piezoelectric element, whereby an electric signal indicative of the sensed combustion pressure is output from the piezoelectric element.

In the above described conventional detection device, when the housing is tightened by tightening torque for screwing the same into the cylinder head, it is compressed to displace the center shaft upward relative to the housing, so that the preload on the piezoelectric element is reduced. The degree of reduction of the preload depends on the tightening torque. Generally, a piezoelectric element has a characteristic that the sensitivity thereof is higher as preload is larger. Therefore, variation in the tightening torque causes a change in the preload and the resultant change in the sensitivity of the piezoelectric element, which makes the detection accuracy of the detection device unstable. Although there has also been proposed another type of detection device in which preload on a piezoelectric element is increased by tightening torque, in this case as well, the sensitivity varies with the tightening torque, which causes a similar problem.

Further, the above-mentioned center shaft is held in contact with the heater case projecting into the combustion chamber, and hence the center shaft thermally expands due to the heat of high-temperature combustion gases transmitted via the heater case. This thermal expansion also causes upward displacement of the nut pressing the piezoelectric element against the housing. Therefore, in this case as well, the preload on the piezoelectric element is reduced to change the sensitivity of the piezoelectric element, causing the same problem as described above.

SUMMARY OF THE INVENTION

It is an object of the present invention to provide an in-cylinder pressure detection device which is capable of ensuring stable detection accuracy irrespective of tightening torque applied in mounting the in-cylinder pressure detection device and thermal expansion of component parts thereof.

To attain the above object, the present invention provides an in-cylinder pressure detection device for detecting an in-cylinder pressure as a pressure within a cylinder of an internal combustion engine, comprising a housing that has a pair of end walls opposed to each other and is screwed into a body of the engine, an in-cylinder pressure-transmitting member that extends through the housing, the in-cylinder pressure-transmitting member having one end projecting into the cylinder, and a flange part accommodated in the housing, a first piezoelectric element that is accommodated in the housing and sandwiched between one of the end walls and the flange part in a preloaded state, for outputting a first detection signal according to the in-cylinder pressure transmitted via the in-cylinder pressure-transmitting member, and a second piezoelectric element that is accommodated in the housing and sandwiched between the other of the end walls and the flange part in a preloaded state, for outputting a second detection signal according to the in-cylinder pressure transmitted via the in-cylinder pressure-transmitting member.

According to this in-cylinder pressure detection device, the housing having the pair of end walls opposed to each other is screwed into the body of the engine. Further, the first piezoelectric element is sandwiched in a preloaded state between one of the end walls and the flange part of the in-cylinder pressure-transmitting member extending through the housing, and the second piezoelectric element is sandwiched between the other of the end walls and the flange part in a preloaded state. When in-cylinder pressure acts on the one end of the in-cylinder pressure-transmitting member projecting into the cylinder, the in-cylinder pressure-transmitting member is compressed. This compression causes displacement of the in-cylinder pressure-transmitting member to reduce the load acting on the first piezoelectric element (disposed e.g. on one side of the flange portion toward the cylinder). As a result, the first piezoelectric element expands, whereby the first detection signal dependent on the in-cylinder pressure is output. At the same time, the displacement of the in-cylinder pressure-transmitting member causes an increase in the load acting on the second piezoelectric element (disposed e.g. on the other side of the flange part remote from the cylinder). As a result, the second piezoelectric element is compressed, whereby the second detection signal dependent on the in-cylinder pressure is output.

Further, the tightening of the housing against the body of the engine causes compression of the housing, which places the in-cylinder pressure-transmitting member in relatively elongated relation to the housing. As a result, the preload on the first piezoelectric element is reduced, whereas the preload on the second piezoelectric element is increased. The changes in the preload become larger as the tightening torque is higher. Thus, the sensitivities of the first and second piezoelectric elements change in the opposite directions in accordance with a change in the tightening torque. Therefore, by combining the first detection signal output from the first piezoelectric element and the second detection signal output from the second piezoelectric element, the change in the sensitivity due to variation in the tightening torque applied in mounting the in-cylinder pressure detection device is made very small, which makes it possible to ensure stable detection accuracy.

Further, the in-cylinder pressure-transmitting member projecting into the cylinder is exposed to high-temperature combustion gases and hence is elongated due to thermal expansion. As a result, the preload on the first piezoelectric element is reduced to lower the sensitivity of the first piezoelectric element, whereas the preload on the second piezoelectric element is increased to enhance the sensitivity. Thus, the thermal expansion of the in-cylinder pressure-transmitting member also makes the sensitivities of the first and second piezoelectric elements change in the opposite directions. Therefore, similarly to the case of the tightening torque, by combining the first detection signal and the second detection signal, the change in the sensitivity caused by the thermal expansion is made very small, which makes it possible to ensure stable detection accuracy.

Furthermore, by combining the first detection signal and the second detection signal, a detection signal having a large value can be obtained compared with the case where a single piezoelectric element is used, and hence the SN (signal/noise) ratio of the detection signal can be improved. Further, for the same reason, the sensitivity of the in-cylinder pressure detection device can be improved, which makes it possible to enhance detection accuracy of the in-cylinder pressure detection device.

Preferably, the in-cylinder pressure detection device further comprises an output circuit for outputting the sum of the first detection signal and the second detection signal as a detection signal indicative of the in-cylinder pressure.

With this arrangement of the preferred embodiment, the sum of the first detection signal and the second detection signal is output by the output circuit as a detection signal indicative of the in-cylinder pressure. The first detection signal and the second detection signal are thus added up in advance, so that it is possible to provide the same advantageous effects as described above. Further, since the single detection signal is output from the in-cylinder pressure detection device, processing of this detection signal can be simplified.

The above and other objects, features, and advantages of the present invention will become more apparent from the following detailed description taken in conjunction with the accompanying drawings.

DETAILED DESCRIPTION OF PREFERRED EMBODIMENTS

Figure 1:
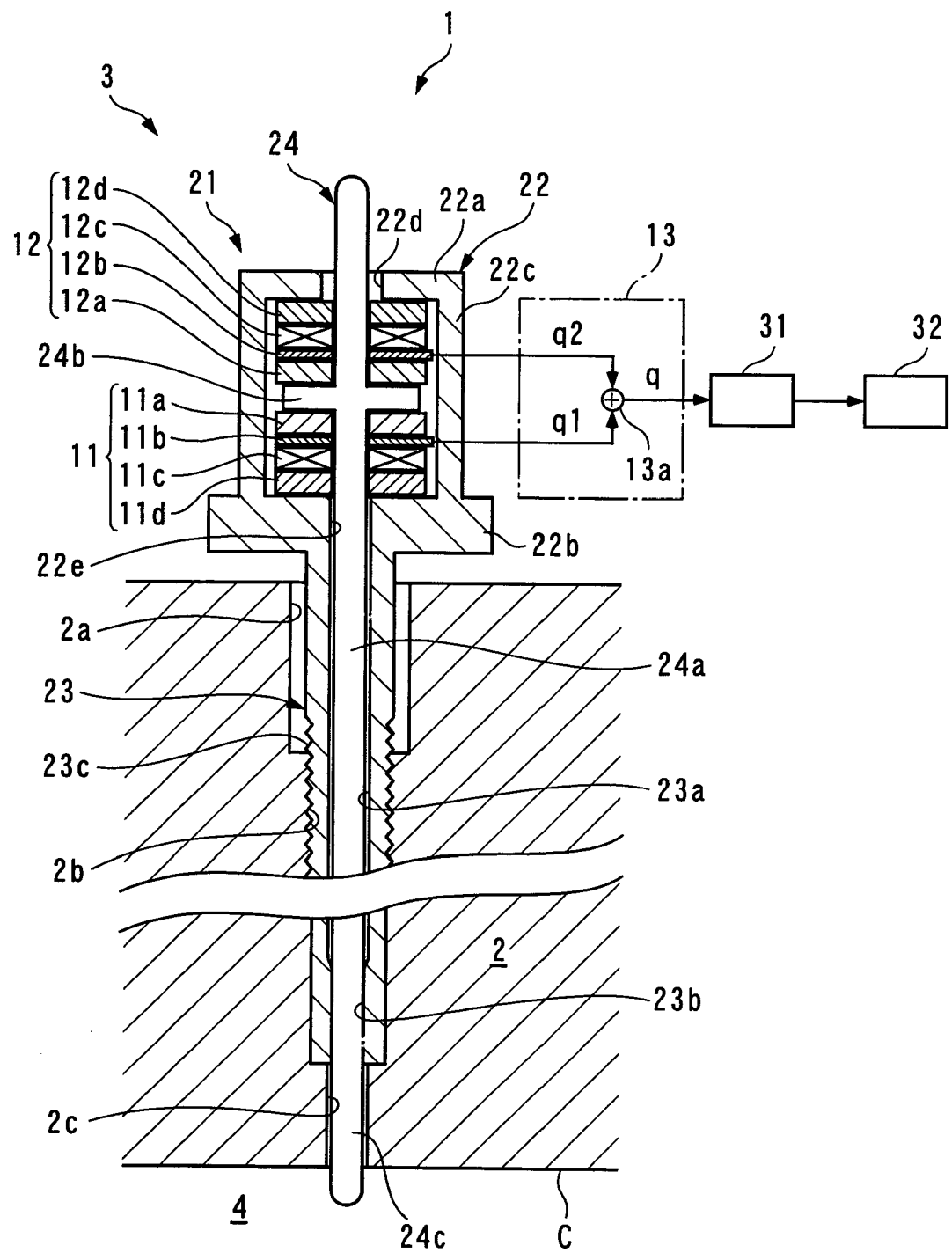
FIG. 1 is a cross-sectional view of an in-cylinder pressure detection device according to an embodiment of the present invention, which is mounted in an internal combustion engine.

The present invention will now be described in detail with reference to the drawings showing a preferred embodiment thereof. As shown in FIG. 1, an in-cylinder pressure detection device 1 is integrally formed with a glow plug 3 mounted in a cylinder head 2 (body of an internal combustion engine) e.g. of a diesel internal combustion engine. The in-cylinder pressure detection device 1 is comprised of a first detecting section 11, a second detecting section 12, and an output circuit 13 connected to the first and second detecting sections 11 and 12.

The glow plug 3 is comprised of a housing 21 and an inner member 24 (in-cylinder pressure-transmitting member) extending through the housing 21. The housing 21 is comprised of an accommodating section 22 and a support part 23 extending downward from the accommodating section 22.

The accommodating section 22 is integrally formed by a top wall 22a and a bottom wall 22b (a pair of end walls) vertically opposed to each other, and a cylindrical sidewall 22c extending between the top wall 22a and the bottom wall 22b. The top wall 22a has an annular shape with a central hole 22d. The outer diameter of the top wall 22a is equal to the outer diameter of the sidewall 22c. The hole 22d has a smaller diameter than the inner diameter of the sidewall 22c. The bottom wall 22b has a hexagonal shape larger in area than an area defined by the sidewall 22c, and has a central part thereof formed with a first receiving hole 22e which is smaller in diameter than the hole 22d.

The support part 23 is formed into a slim hollow cylindrical shape extending vertically. The support part 23 has a central inner hole formed as a second receiving hole 23a. The second receiving hole 23a has the same diameter as the first receiving hole 22e of the bottom wall 22b and is continuous with the same. Further, the second receiving hole 23a has a lower end portion thereof formed as a fitting hole 23b with a reduced diameter. The support part 23 has a threaded part 23c formed in a middle portion of the outer peripheral surface thereof.

The inner member 24 is integrally formed by a rod-like shaft part 24a extending vertically with a fixed diameter, a flange part 24b formed at an upper portion of the shaft part 24a, and a rod-like glow heater part 24c extending downward from the shaft part 24a, with a fixed diameter. The shaft part 24a has an upper end portion thereof projecting upward through the hole 22d of the accommodating section 22, a middle portion thereof loosely fitted through the first and second receiving holes 22e and 23a, and a lower end portion thereof press-fitted into the fitting hole 23b. The flange part 24b has a disk shape, and has a slightly smaller diameter than the inner diameter of the accommodating section 22. The flange part 24b is disposed at a vertically central location in the accommodating section 22. The glow heater part 24c projects downward from the support part 23.

On the other hand, the cylinder head 2 has a first receiving hole 2a, a threaded hole 2b, and a second receiving hole 2c formed therein vertically continuously such that a lower hole has a smaller diameter. The first receiving hole 2a has a larger diameter than that of the support part 23. The second receiving hole 2c has a diameter smaller than the outer diameter of the support part 23 and slightly larger than the diameter of the glow heater part 24c.

The glow plug 3 is mounted in the cylinder head 2 by screwing the threaded part 23c of the housing 21 into the threaded hole 2b of the cylinder head 2 and tightening the same. In this state, the glow heater part 24c of the inner member 24 is loosely fitted in the second receiving hole 2c, and the lower end portion of the inner member 24 slightly projects into a combustion chamber 4 in a cylinder C. The glow heater part 24c is supplied with electric power from a power supply (not shown) to warm up the combustion chamber 4.

The first and second detecting sections 11 and 12 of the in-cylinder pressure detection device 1 are accommodated in the accommodating section 22 at respective symmetrical locations above and below the flange part 24b. The first detecting section 11 is comprised of a first insulation plate 11a, a first output-side electrode plate 11b, a first piezoelectric element 11c and a first ground-side electrode plate 11d arranged from top to bottom in the mentioned order. Each of these elements has an annular shape formed with a hole in a central portion thereof, and the shaft part 24a of the inner member 24 is fitted through these holes. Further, the first insulation plate 11a, the first output-side electrode plate 11b, the first piezoelectric element 11c, and the first ground-side electrode plate 11d are sandwiched between the flange part 24b and the bottom wall 22b in a state having a predetermined preload applied thereto.

The second detecting section 12 is configured similarly to the first detecting section 11, and is comprised of a second insulation plate 12a, a second output-side electrode plate 12b, a second piezoelectric element 12c, and a second ground-side electrode plate 12d arranged from bottom to top in the mentioned order. The plates and element are also formed with central holes through which the shaft part 24a is fitted. Further, the second insulation plate 12a, the second output-side electrode plate 12b, the second piezoelectric element 12c, and the second ground-side electrode plate 12d are sandwiched between the top wall 22a and the flange part 24b in a state having the above-mentioned predetermined preload applied thereto.

Figure 2A:
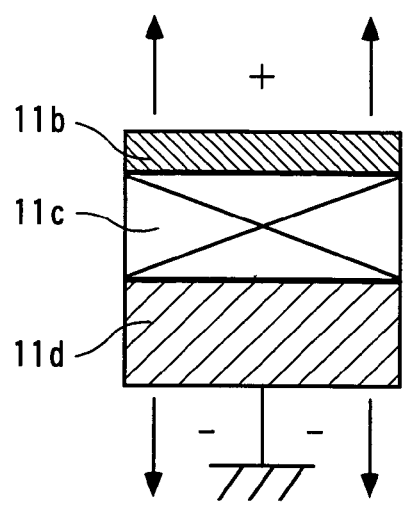
FIG. 2A is a schematic diagram useful in explaining a piezoelectric effect occurring in a first piezoelectric element.
Figure 2B:
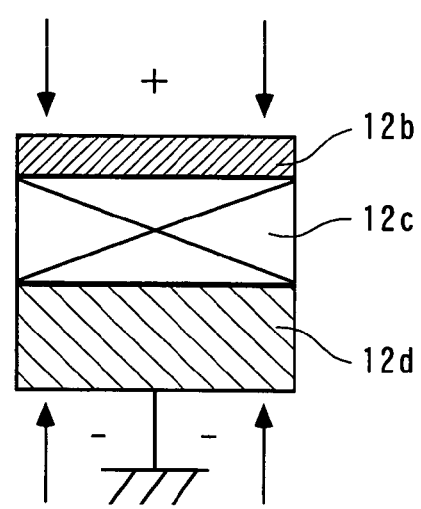
FIG. 2B is a schematic diagram useful in explaining a piezoelectric effect occurring in a second piezoelectric element.

The first and second piezoelectric elements 11c and 12c have the same output characteristics, and are electrically connected as shown in FIGS. 2A and 2B. More specifically, as shown in FIG. 2A, a surface of the first piezoelectric element 11c on a side where a positive charge is generated when the first piezoelectric element 11c expands is in contact with the first output-side electrode plate 11b, and a surface on the other side is in contact with the first ground-side electrode plate 11d so as to be grounded. On the other hand, as shown in FIG. 2B, a surface of the second piezoelectric element 12c on a side where a positive charge is generated when the second piezoelectric element 12c is compressed is in contact with the second output-side electrode plate 12b, and a surface of the same on the other side is in contact with the second ground-side electrode plate 12d so as to be grounded.

The output circuit 13 includes an adder 13a. The output circuit 13 adds up detection signals output from the first and second detecting sections 11 and 12 using the adder 13a, and outputs the resulting signal. The signal is output from the output circuit 13 to an ECU 32 via a charge amplifier 31. The ECU 32 is implemented by a microcomputer comprised of an I/O interface, a CPU, a RAM, and a ROM.

With the above arrangement, when in-cylinder pressure acts on the lower end of the glow heater part 24c of the inner member 24, the inner member 24 is compressed. The displacement of the inner member 24 due to the compression causes reduction of the load acting on the first piezoelectric element 11c disposed on a side of the flange part 24b toward the combustion chamber 4. As a result, the first piezoelectric element 11c expands to generate an electrical charge (hereinafter referred to as "the first detection signal") q1. Further, the displacement of the inner member 24 causes an increase in the load acting on the second piezoelectric element 12c disposed on the other side of the flange part 24b remote from the combustion chamber 4, whereby the second piezoelectric element 12c is compressed to generate an electrical charge (hereinafter referred to as "the second detection signal") q2. The first and second detection signals q1 and q2 are output via the respective first and second output-side electrode plates 11b and 12b, and added up by the adder 13a of the output circuit 13. A detection signal q obtained by the adding operation is output to the charge amplifier 31 as a signal indicative of the sensed in-cylinder pressure. The charge amplifier 31 converts the input detection signal q into a voltage signal to output the same to the ECU 32. The ECU 32 controls a fuel injection time period of each injector (not shown) of the engine or like parameters according to the input voltage signal.

When the glow plug 3 is mounted, the tightening of the housing 21 against the cylinder head 2 causes compression of the housing 21, which places the inner member 24 in relatively elongated relation to the housing 21. As a result, the preload on the first piezoelectric element 11c is reduced to lower the sensitivity of the first piezoelectric element 11c, whereas the preload on the second piezoelectric element 12c is increased to enhance the sensitivity. The respective sensitivity levels of the first and second piezoelectric elements 11c and 12c become higher as the tightening torque is higher. Thus, the sensitivities of the first and second piezoelectric elements 11c and 12c change in the opposite directions in accordance with a change in the tightening torque. Therefore, the use of the detection signal q as an output from the in-cylinder pressure detection device 1 makes it possible to minimize the change in the sensitivity caused by variation in the tightening torque applied for mounting the glow plug 3. Further, according to the present embodiment, since the first and second piezoelectric elements 11c and 12c are configured to have the same output characteristics, constant sensitivity can be obtained irrespective of the tightening torque, which makes it possible to maintain high and stable detection accuracy.

Further, since the glow heater part 24c projecting into the combustion chamber 4 is exposed to the high-temperature combustion gases, the inner member 24 thermally expands. As a result, similarly to the case of the tightening torque, the preload on the first piezoelectric element 11c is reduced to lower the sensitivity of the first piezoelectric element 11c, whereas the preload on the second piezoelectric element 12c is increased to enhance the sensitivity. Thus, the thermal expansion of the inner member 24 also changes the sensitivities of the first and second piezoelectric elements 11c and 12c in the opposite directions. Therefore, constant sensitivity can be obtained irrespective of the thermal expansion of the inner member 24, which makes it possible to maintain high and stable detection accuracy.

Furthermore, since the detection signal q is obtained by adding up the first and second detection signals q1 and q2, the SN (signal/noise) ratio of the detection signal of the in-cylinder pressure detection device 1 can be improved compared with the case where a single piezoelectric element is used. For the same reason, the sensitivity of the in-cylinder pressure detection device 1 can be improved, which makes it possible to enhance detection accuracy of the in-cylinder pressure detection device 1. In addition, since the single detection signal q is output from the in-cylinder pressure detection device 1, it is possible to simplify a computation process by the ECU 3.

It should be noted that the present invention is not limited to the above described embodiment, but can be practiced in various forms. For example, although in the present embodiment, the in-cylinder pressure detection device 1 is integrally formed with the glow plug 3, the in-cylinder pressure detection device 1 may be provided separately from the glow plug 3. Further, although the first and second detection signals q1 and q2 are added up by the output circuit 13, the signals q1 and q2 may be separately input to the ECU 32 via the charge amplifier 31 and added up by computation of the ECU 32. Furthermore, although in the present embodiment, the glow plug 3 is mounted in the engine by screwing the housing 21 into the cylinder head 2 and tightening the same, this is not limitative, but the housing 21 may be press-fitted into the cylinder head 2. Moreover, the in-cylinder pressure detection device according to the present invention can be applied to various types of industrial internal combustion engines including engines for ship propulsion machines, such as an outboard motor having a vertically-disposed crankshaft.

It is further understood by those skilled in the art that the foregoing is a preferred embodiment of the invention, and that various changes and modifications may be made without departing from the spirit and scope thereof.

What is claimed is:

1. An in-cylinder pressure detection device for detecting an in-cylinder pressure as a pressure within a cylinder of an internal combustion engine, comprising:
   a housing that has a pair of end walls opposed to each other and is screwed into a body of the engine;
   an in-cylinder pressure-transmitting member that extends through said housing, said in-cylinder pressure-transmitting member having one end projecting into the cylinder, and a flange part accommodated in said housing;
   a first piezoelectric element that is accommodated in said housing and sandwiched between one of said end walls and said flange part in a preloaded state, said first piezoelectric element distorting according to the in-cylinder pressure transmitted via said in-cylinder pressure-transmitting member to output a first detection signal indicative of the in-cylinder pressure; and
   a second piezoelectric element that is accommodated in said housing and sandwiched between the other of said end walls and said flange part in a preloaded state, said second piezoelectric element distorting in a direction opposite to a direction of distortion of said first piezoelectric element according to the in-cylinder pressure transmitted via said in-cylinder pressure-transmitting member to output a second detection signal indicative of the in-cylinder pressure.

2. An in-cylinder pressure detection device as claimed in claim 1, further comprising an output circuit for outputting a sum of the first detection signal and the second detection signal as a detection signal indicative of the in-cylinder pressure.

3. An in-cylinder pressure detection device for detecting an in-cylinder pressure as a pressure within a cylinder of an internal combustion engine, comprising:
   a housing for insertion into a body of an engine, the housing comprising a pair of end walls opposed to each other;
   an in-cylinder pressure-transmitting member that extends through said housing, said in-cylinder pressure-transmitting member having one end projecting into the cylinder, and a flange part accommodated in said housing;
   a first piezoelectric element that is accommodated in said housing and sandwiched between one of said end walls and said flange part in a preloaded state, said first piezoelectric element distorting according to the in-cylinder pressure transmitted via said in-cylinder pressure-transmitting member to output a first detection signal indicative of the in-cylinder pressure; and
   a second piezoelectric element that is accommodated in said housing and sandwiched between the other of said end walls and said flange part in a preloaded state, said second piezoelectric element distorting in a direction opposite to a direction of distortion of said first piezoelectric element according to the in-cylinder pressure transmitted via said in-cylinder pressure-transmitting member to output a second detection signal indicative of the in-cylinder pressure.

4. The in-cylinder pressure detection device of claim 3, further comprising an output circuit for outputting a sum of the first detection signal and the second detection signal as a detection signal indicative of the in-cylinder pressure.

* * * * *